Nov. 17, 1925.

E. BISBING

LOCK NUT

Original Filed June 23, 1923

1,562,141

Edward Bisbing INVENTOR

BY *Victor J. Evans*

ATTORNEY

Patented Nov. 17, 1925.

1,562,141

UNITED STATES PATENT OFFICE.

EDWARD BISBING, OF SOMERSET, PENNSYLVANIA.

LOCK NUT.

Application filed June 23, 1923, Serial No. 647,363. Renewed August 14, 1925.

*To all whom it may concern:*

Be it known that I, EDWARD BISBING, a citizen of the United States, residing at Somerset, in the county of Somerset and State of Pennsylvania, have invented new and useful Improvements in Lock Nuts, of which the following is a specification.

This invention relates to nut locks, and contemplates the provision of a locking element designed for use in conjunction with a nut having a slot transversely across the face thereof, and a bolt having a flat portion, the locking element being associated with the nut after it has been tightened upon the bolt, the locking element being adapted to be bent to engage the both sides of the nut in a manner to prevent retrograde movement of the latter on the bolt.

The nature and advantages of the invention will be better understood when the following detailed description is read in connection with the accompanying drawing, the invention residing in the construction, combination and arrangement of parts as claimed.

In the drawings forming part of this application, like numerals of reference indicate similar parts in the several views, and wherein.

Figure 1:
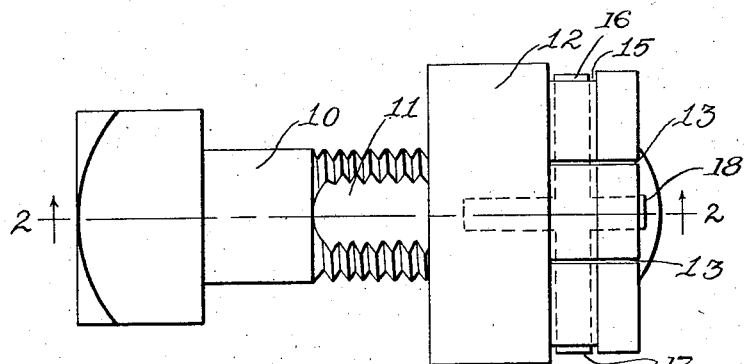
Figure 1 is a view showing the manner of locking the nut upon the bolt in accordance with the present invention.
Figure 2:
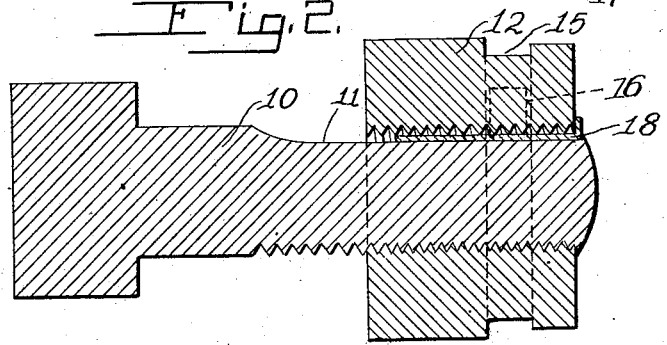
Figure 2 is a sectional view on the line 2—2 of Figure 1.
Figure 3:
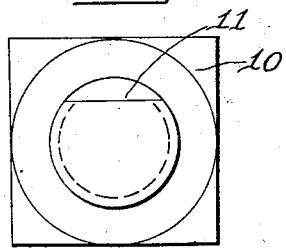
Figure 3 is a detail view of the bolt.
Figure 4:
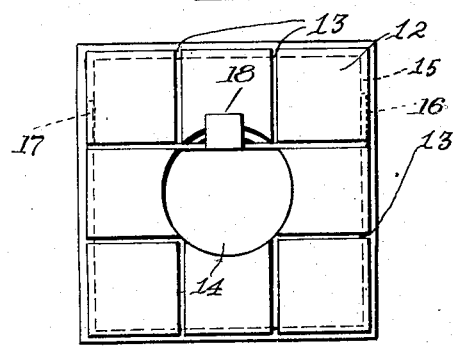
Figure 4 is a detail view of the nut.

As herein above stated, the invention is intended for use in conjunction with a bolt 10 having a flat surface 11, and a nut 12 of the construction shown in Figure 4. This nut is of the usual design except that its face is provided with transverse slots 13 which intersect the bore 14. It will be noted that these slots also intersect each other, so that after the nut has been tightened upon the bolt as much as possible, there is always one of these slots arranged transversely of the nut extending across the flat portion 11 of the bolt. This is necessary in order that the locking element to be hereinafter described can be associated with the nut to prevent retrograde movement thereof. If desired, the sides of the nut can be grooved as at 15 to accommodate the terminals of the locking elements when the latter are bent against the sides of the nut, but this is not absolutely essential, and the nut can be constructed with perfectly flat sides.

Figure 5:
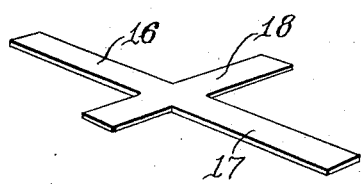
Figure 5 is a detail view of the locking element.

The locking element is clearly shown in Figure 5, and is formed from a single piece of material having a configuration similar to a cross, the main portions of this locking element being indicated at 16 and 17 respectively with the extensions 18 arranged at a right angle thereto. In use, the body portions 16 of this locking element are adapted to be received by the particular slot 13 which extends across the flat portion of the bolt, after the nut has been sufficiently tightened upon the bolt, and obviously, the extensions 18 are then arranged to bear against the flat surfaces 11 between the latter and the threads of the nut 12. The outer extension 18 is then adapted to be bent against the face of the nut, while the terminals of the body portions 16 and 17 of this locking element, are adapted to be bent against the adjacent sides of the nut, the body portions 16 and 17 being considerably longer than the width of the nut for this purpose. If the nut is provided with the grooves above referred to, these terminals are bent in the grooves, which of course makes the structure more effective for the purpose intended, as the terminals cannot be very easily moved out of the grooves irrespective of the amount of strain to which the nut may be subjected.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In combination, a bolt having a flat surface, a nut adapted to be threaded on the bolt and having transverse slots adapted to extend across the flat surface when the nut is tightened on the bolt, a locking element including a body portion adapted to be arranged in said slot with its terminals projecting beyond the sides of the nut and adapted to be bent against said sides, and extensions projecting from said body portion at a right angle thereto, one of said extensions being positioned between the nut and the flat surface of the bolt when the parts are associated, and the other extension projecting beyond the face of the bolt and adapted to be bent across the latter for the purpose specified.

In testimony whereof I affix my signature.

EDWARD $\overset{\text{his}}{\times}$ BISBING.
mark